United States Patent
Korbler

(10) Patent No.: US 7,836,769 B2
(45) Date of Patent: Nov. 23, 2010

(54) APPARATUS AND METHOD OF MEASURING ACOUSTICAL ENERGY APPLIED TO A SUBSTRATE

(75) Inventor: John Korbler, Mertztown, PA (US)

(73) Assignee: Akrion Systems LLC

( * ) Notice: Subject to any disclaimer, the term of this patent is extended or adjusted under 35 U.S.C. 154(b) by 604 days.

(21) Appl. No.: 11/837,292

(22) Filed: Aug. 10, 2007

(65) Prior Publication Data

US 2008/0034875 A1 Feb. 14, 2008

Related U.S. Application Data

(60) Provisional application No. 60/837,117, filed on Aug. 10, 2006.

(51) Int. Cl.
 *G01H 1/00* (2006.01)
 *H01L 41/00* (2006.01)
(52) U.S. Cl. .................... 73/645; 73/1.48; 73/649; 310/313
(58) Field of Classification Search ............ 73/645, 73/649, 1.48; 310/313
 See application file for complete search history.

(56) References Cited

U.S. PATENT DOCUMENTS

| | | | |
|---|---|---|---|
| 4,597,292 A | 7/1986 | Fujii et al. | |
| 5,191,796 A | 3/1993 | Kishi et al. | |
| 5,306,978 A * | 4/1994 | Yamanouchi et al. | 310/313 C |
| 5,463,593 A | 10/1995 | Zanelli et al. | |
| 5,475,889 A * | 12/1995 | Thrasher et al. | 15/88.3 |
| 5,927,308 A * | 7/1999 | Kim | 134/172 |
| 6,446,296 B1 * | 9/2002 | Middendorf et al. | 15/77 |
| 6,539,952 B2 * | 4/2003 | Itzkowitz | 134/1.3 |
| 6,626,026 B2 | 9/2003 | Banda et al. | |
| 6,637,268 B1 * | 10/2003 | Toda | 73/602 |
| 6,766,813 B1 * | 7/2004 | Sayka et al. | 134/148 |
| 7,027,921 B2 | 4/2006 | Kalantar-Zadeh et al. | |
| 7,207,222 B2 | 4/2007 | Thompson et al. | |
| 7,587,806 B2 | 9/2009 | Furukawa | |
| 2007/0190662 A1 | 8/2007 | Baetzold et al. | |

* cited by examiner

*Primary Examiner*—J M Saint Surin
(74) *Attorney, Agent, or Firm*—The Belles Group, P.C.

(57) ABSTRACT

An apparatus and method for measuring the acoustical energy that will be applied to a substrate during cleaning. A substrate is provided that has placed upon it a piezoelectric member that is capable of sensing the acoustical power that is transmitted. This enables the detection and calibration of transducer assemblies that are used in the cleaning of substrates.

20 Claims, 6 Drawing Sheets

APPARATUS AND METHOD OF MEASURING ACOUSTICAL ENERGY APPLIED TO A SUBSTRATE

CROSS-REFERENCE TO RELATED APPLICATIONS

The present application claims the benefit of U.S. Provisional Patent Application No. 60/837,117, filed Aug. 10, 2006, the entirety of which is hereby incorporated by reference.

FIELD OF THE INVENTION

The present invention relates generally to the field of measuring acoustical energy and specifically to apparatus and methods for measuring characteristics of an acoustical energy field used to process substrates such as semiconductor wafers.

BACKGROUND OF THE INVENTION

Semiconductor wafers are frequently cleaned with a cleaning solution into which megasonic energy is propagated. Megasonic energy cleaning apparatuses typically comprise a transducer assembly which is a piezoelectric transducer coupled to a transmitter. The transducer is electrically excited such that it vibrates, and the transmitter transmits high frequency energy into a liquid layer coupled with the wafer. The agitation of the cleaning fluid produced by the megasonic energy loosens particles on the semiconductor wafers.

The number of watts applied to the transducer is one way to measure the acoustical energy applied to the wafer. The problem with measuring the acoustical energy in this fashion is that all energy applied to the transducer does not translate directly into the actual strength of acoustical energy applied to the substrate. Some of the applied power provided to the transducer is lost as heat, some of the energy is reflected, while some of the energy is lost as mechanical energy not applied in the direction of the substrate. Other factors that play into the loss of energy are differences in the characteristics of individual transducers stemming from the manufacture and assembly of the individual components, the differences in frequency characteristics that occur in each unit, and the operating temperature of the transducer assembly and it's components.

Therefore, there remains a need to accurately measure the acoustical energy applied to a substrate that takes into account the factors discussed above.

SUMMARY OF THE INVENTION

It an object of the present invention to provide an apparatus for measuring characteristics of an acoustical energy field applied to a substrate.

It is a further object of the present invention to provide a method for measuring characteristics of an acoustical energy field applied to a substrate.

These and other objects are met by the present invention which in one aspect can be an apparatus for measuring characteristics of an acoustical energy field comprising: a piezoelectric member comprising a plurality of measuring segments; and wherein each measuring segment comprises an isolated positive electrode and a negative electrode operably connected to the piezoelectric member so that when the piezoelectric member is subjected to the acoustical energy field, the positive and negative electrodes produce an electrical signal indicative of the characteristics of the acoustical energy field present at that measuring segment.

In another aspect, the invention can be an apparatus for measuring characteristics of an acoustical energy field comprising: a substrate having a top surface and a bottom surface; a piezoelectric member comprising a plurality of segments comprising an isolated positive electrode and a negative electrode operably connected to the piezoelectric member so that when the piezoelectric member is subjected to an acoustical energy field, the positive and negative electrodes produce an electrical signal indicative of the characteristics of the acoustical energy field present at that segment; and the piezoelectric member bonded to the bottom surface of the substrate.

In another aspect, the invention can be a method of measuring characteristics of an acoustical energy field at various locations comprising: (a) positioning an apparatus comprising a piezoelectric member in an acoustical energy field, the piezoelectric member comprising a plurality of segments comprising an isolated positive electrode and a negative electrode operably connected to the piezoelectric member; and (b) each set of positive and negative electrodes producing an electrical signal indicative of the characteristics of the acoustical energy field present at the segment on which the set of positive and negative electrodes are located.

DETAILED DESCRIPTION OF THE DRAWINGS

Figure 1:
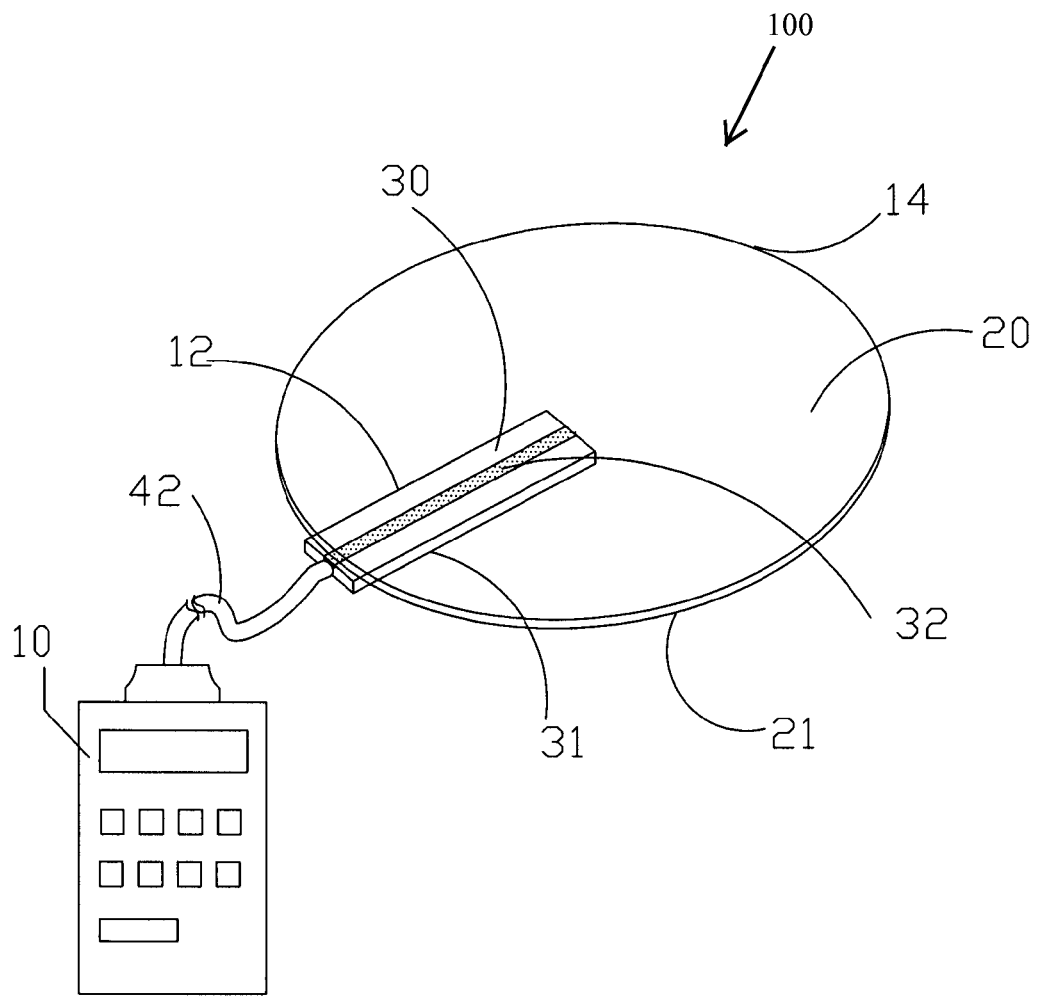
FIG. 1 is a perspective view of a substrate sensor apparatus according to one embodiment of the present invention.

Referring to FIG. 1, the substrate sensor apparatus 100 generally comprises a substrate 14, a piezoelectric member 12, and an electrical signal analyzer 10. The substrate sensor apparatus 100 is used to measure acoustical energy applied to a substrate, thereby permitting the calibration of apparatus that generate acoustical energy, such as transducer assemblies. The substrate 14 is a disc-like structure comprising a top surface 20 and a bottom surface 21. The substrate 14 is made of glass, silicone, quartz or any other material that allows for minimum impedance of acoustical energy. It is preferable that the substrate 14 be sized and shaped to match the dimensions of a substrate to be cleaned with the use of acoustical energy. More specifically, the substrate 14 is sized and shaped to match the size and shape of a 300 mm semiconductor wafer. Any sized substrate may be used however, and the size of the substrate 14 may vary depending upon the size of the substrate that is to be cleaned.

The piezoelectric member 12 comprises a top surface 30 and a bottom surface 31. The top surface 30 of the piezoelectric member 12 is bonded to the bottom surface 21 of the substrate 14. Preferably, the bond between the piezoelectric member 12 and the substrate 14 is a direct and continuous bond created with the use of an epoxy. The invention is not so limited, however, and other methods of connecting the piezoelectric member 12 to the substrate 14 may be used so long as when acoustic energy passes through the substrate 14 and into the piezoelectric member 12, the energy is not significantly affected by the attachment method.

The piezoelectric member 12 is a rectangular bar, preferably made of Lead Zirconate Titanate ("PZT") or Polyvinylidine difluoride ("PVDF"). Other materials may be used however, so long as the material exhibits piezoelectricity, or the ability to generate an electric signal in response to applied stress. The piezoelectric member 12 is long enough to extend to the center of the substrate 14. In alternative embodiments, the piezoelectric member 12 may extend the full length of the substrate 14. The size and the position of the piezoelectric member 12 relative to the substrate 14 is affected by where on the substrate 14 the acoustical energy is to be transmitted. In the illustrated embodiment, the piezoelectric member extends only to the center of the substrate 14 because the acoustical energy field is applied to that section of the substrate 14 only. Similarly, the width of the piezoelectric member 12 is determined based on the width of the acoustical energy field to be measured. The thickness of the piezoelectric member 12 relative to the thickness of the substrate 14 is exaggerated in FIG. 1 so that the components may be more clearly visible. The thickness of the piezoelectric member 12 is optimized based upon the frequency of the acoustical energy to be measured. Changing the thickness of the piezoelectric member 12 affects the resonant frequency of the piezoelectric member 12. Thus, if the frequency of the acoustical energy to measured is 5 MHz, then the resonant frequency of the piezoelectric member is preferably 1 MHz. It is preferable that the resonant frequency of the piezoelectric member 12 be different than the frequency of the acoustical energy to be measured because if the two frequencies are equal then the piezoelectric member 12 is more sensitive and will produce higher frequency when measuring the acoustical energy applied. The higher the resonant frequency desired, the thicker the piezoelectric member 12 will be.

Figure 2:
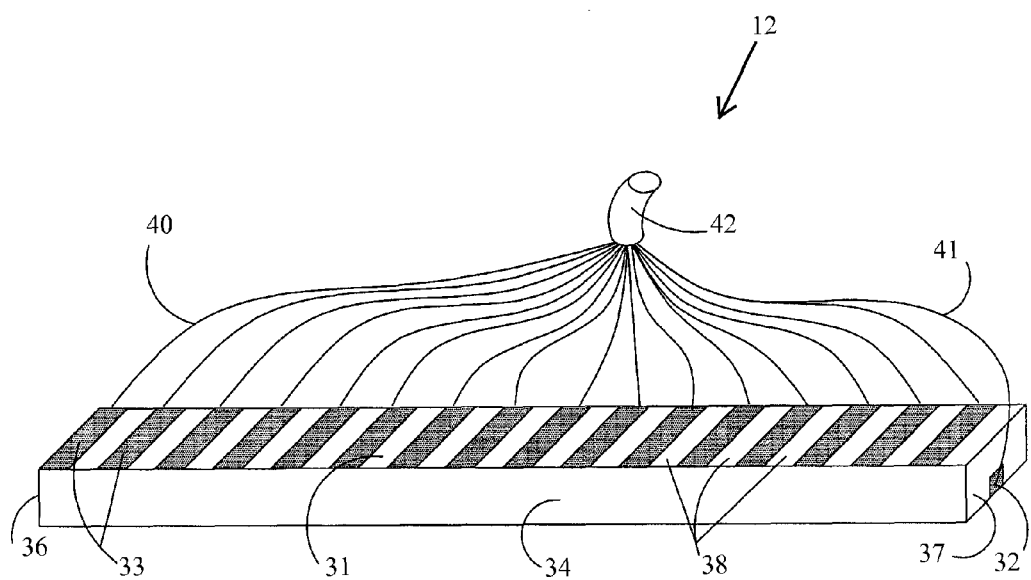
FIG. 2 is a bottom perspective view of the piezoelectric member according to one embodiment of the present invention.

The piezoelectric member 12 further comprises a negative electrode 32 and a plurality of isolated positive electrodes 33 (shown in FIG. 2). The negative electrode 32 is positioned on the top surface 30 of the piezoelectric sensor 12, while the positive electrodes 33 are positioned on the opposite surface of the piezoelectric member 12. As will be discussed in further detail below, the area of the piezoelectric member 12 which has a positive electrode 33 on one side that is aligned with the negative electrode 32 on the opposite side is a measuring segment of the piezoelectric member 12. A positive electrode 33 aligned with a negative electrode 32 will be called a pair. When the substrate 14 is subjected to stress resulting from an acoustical energy field, each positive and negative electrode 33, 32 pair produces an electrical signal indicative of the characteristics of the acoustical energy field present at that measuring segment.

The substrate 14 may further comprise holes (not illustrated) forming passageways through the substrate 14. The holes allow for better transmission of acoustical energy to the piezoelectric member 12. The holes would be aligned with the measuring segments of the piezoelectric member 12.

The negative and positive electrodes 32, 33 are operably connected to the electrical signal analyzer 10 via the wires 40, 41 (shown in FIG. 2) inserted into the bus cable 42. The electrical signal analyzer 10 receives the electrical signal from the negative and positive electrodes 32, 33. The electrical analyzer 10 may comprise a programmable amplifier and a filter so that a frequency range may be selected for further processing. It is preferable to remove the low end and high end frequencies from the transmission in order to eliminate motor noise and other environmental components from the electrical signal to be processed Preferably the frequencies measured are between 800 kHz and 3 MHz. The electrical analyzer 10 then calculates the power for the selected frequency range and displays among other variables, the primary frequency, the signal power and/or the average signal power. The calculation of the power could be done with an RMS chip, or other means well known in the art.

As will be discussed in further detail below, in the preferred embodiment, the electrical analyzer 10 receives 16 electrical signals from 16 isolated positive electrodes 33 (shown in FIG. 2) and the negative electrode 32. Thus, the electrical analyzer 10 further comprises at least 16 channels, each channel receiving an electrical signal from each positive and negative electrode 33, 32 pair. The electrical analyzer 10 may process and store electrical signal information from all channels simultaneously, while displaying the characteristics, of a single user-selected channel at a time. Alternatively, the electrical analyzer 10 may process one user-selected channel at a time only and display only the channel that is being processed.

Figure 3:
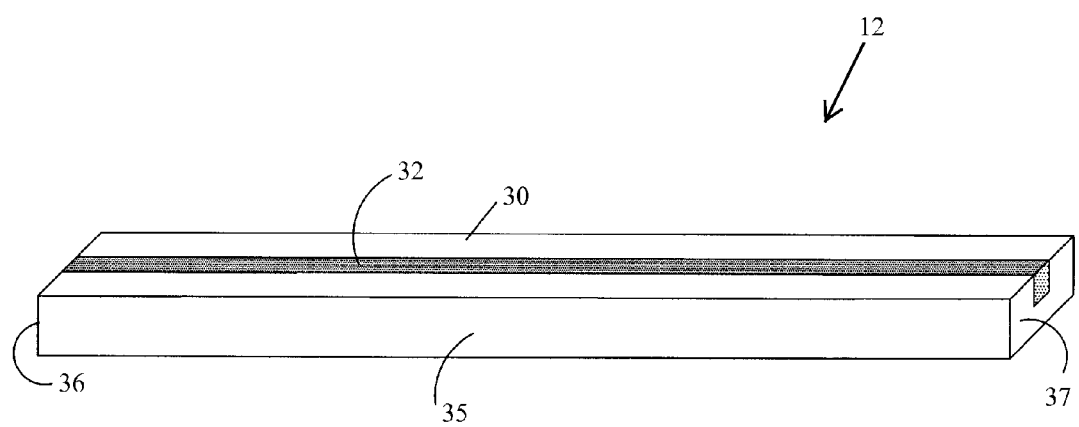
FIG. 3 is a top perspective view of the piezoelectric member of FIG. 2.

Referring now to FIGS. 2 and 3, the piezoelectric member 12 is illustrated removed from the substrate sensor apparatus 100. The piezoelectric member 12 further comprises a first surface 34, a second surface 35, a first end surface 36 and a second end surface 37. The positive electrodes 33 are rectangular strips of electrically conductive material positioned on the bottom surface 31 of the piezoelectric member 12. The positive electrodes 33 extend from the first side 34 to the second side 35. Preferably, the positive and negative electrodes 33, 32 are made of silver, however, any electrically conductive material may be used including chromium and imbium solder. There are 16 positive electrodes positioned in a spaced relation across the top surface 31. In between the positive electrodes there are areas/gaps 38 that have no electrically conductive material. The resulting array of isolated positive electrodes 33 alternating with gaps 38 free of electrically conductive material results in the creation of measuring segments alternating with non-measuring segments of the piezoelectric member 12. More specifically, the area of the piezoelectric sensor 12 that has positive electrode 33 on the top surface 30 aligned with negative electrode 32 on the bottom surface 31 (shown in FIG. 3) is the measuring segment of the piezoelectric member.

The negative electrode 32 is formed by a continuous strip of electrically conductive material that covers an area of the top surface 30 of the piezoelectric member 12. The negative electrode 32 extends from the first end surface 36 and wraps around the corner of the piezoelectric member 12 so as to end on the second end surface 37.

The surface areas of the piezoelectric member 12 that are free of electrically conductive material result in non-measuring segments. When the piezoelectric sensor 12 is subjected to stress from an acoustical energy field, the positive and negative electrodes 33, 32 sense the energy transferred into the measuring segment of the piezoelectric member 12. It preferable that the area of the measuring segments be small enough so that the waves from the acoustical energy field are not cancelled by interference and further so that the results from the electrical signal analyzer 10 do not need to be averaged.

The array of isolated positive electrodes 33 is created by leaving gaps 38 between the positive electrodes of the top surface 30 of the piezoelectric member 12 that are free of electrically conductive material. The resulting isolation of the positive electrodes 33 to create measuring and non-measuring segments can be accomplished in many ways. For example, the entire top surface 30 of the piezoelectric member 12 may be covered with an electrically conductive material and then scribed to create the gaps/areas 38 free of electrically conductive material. There is no limitation on the width of the gaps so long as the positive electrodes 33 are isolated from one another. Additionally, the positive electrodes 33 may be isolated from each other by physically cutting through the piezoelectric member 12 thereby creating a physical gap in the piezoelectric member 12. The gap would then be filled with an epoxy or other material to maintain the stability of the piezoelectric member 12.

Referring still to FIG. 2, attached to the positive electrodes 33 are the positive wires 40. One wire 40 is attached to each positive electrode 33. The ground wire 41 is attached to the negative electrode 32. The attachment may be made by soldering the wires 40, 41 to the electrodes 33, 32. The positive wires 40 and the ground wire 41 are run through bus 42. Bus 42 is then connected to the electrical analyzer 10 (shown in FIG. 1). The wires 40, 41 may be run through bus 42 in a number of ways well known in the art. For example, the ground wire 41 may be shielded from the negative positive wires 40. As discussed in further detail below, in alternative embodiments of the present invention the negative electrode 32 is divided into a plurality of negative electrodes 32 rather than the single strip that is shown in FIG. 3. In those embodiments (shown in FIG. 4-6) the piezoelectric member 12a-c consists of a plurality of negative electrodes 32a-c and a positive electrode 33 where each electrode pair has two wires. The wires are then twisted to form a twisted pair. When the electrodes sense the energy, they transmit an electric signal through the wires 40, 41 and into the electric energy analyzer 10. The electric signal includes a voltage and frequency which is processed and characteristics are displayed by the electrical analyzer 10.

The substrate sensor apparatus 100 may further comprise a housing (not illustrated) to protect the wires 40, 41 and the piezoelectric member 12 from the processing fluid and/or other environmental factors.

Figure 4:
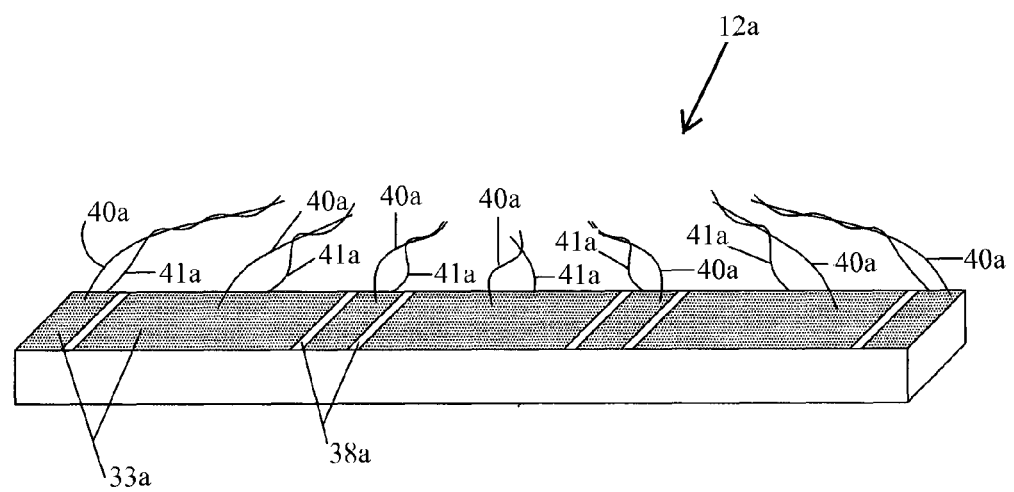
FIG. 4 is a perspective view of a piezoelectric member according to an alternative embodiment of the present invention.
Figure 5:
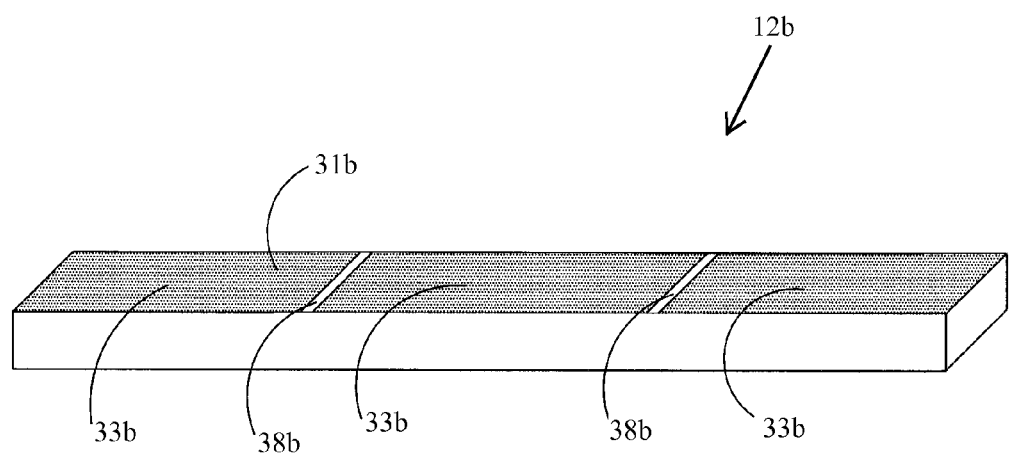
FIG. 5 is a perspective view of a piezoelectric member according to an alternative embodiment of the present invention.
Figure 6:
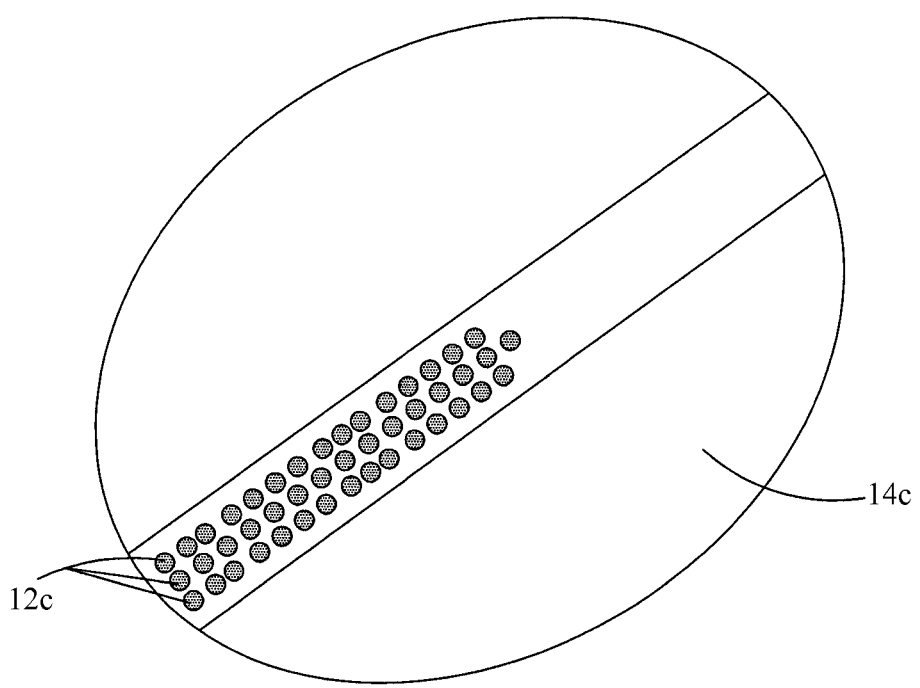
FIG. 6 is a perspective view of a substrate sensor apparatus according to an alternative embodiment of the present invention.

Referring now to FIGS. 4-6, alternative embodiments of the piezoelectric sensor 12 are illustrated. The structural components (and their functioning) of the piezoelectric members 12a-c are substantially similar to those discussed along with respect to piezoelectric member 12. Therefore, in order to avoid redundancy, only those design aspects of piezoelectric member 12a-c that substantially differ from the piezoelectric member 12 will be discussed.

Referring to FIG. 4, piezoelectric sensor 12a comprises a first surface 30a and a second surface 31a. The first surface 30a comprises 7 isolated positive electrodes 33a. The isolated positive electrodes 33a are of two sizes and, are separated by gaps 38a which are areas free of electrically conductive material. The second surface 31a (not shown) comprises 7 isolated negative electrodes 32a that are the mirror image of the positive electrodes 33a. Thus, piezoelectric member 12a, comprises 7 measuring segments that extend from the first surface 34 to the second surface 35 (or the full width) of the piezoelectric member 12a. The non-measuring segments are the areas/gaps 38a that are free of electrically conductible material. Positive wires 40a are connected to positive electrodes 33a. Ground wires 41a are, connected to negative electrodes 32b. Each positive wire 40a is twisted with a negative wire 41a and the pair is then operably connected to electrical analyzer 10 (shown in FIG. 1.)

Referring now to FIG. 5, piezoelectric sensor 12b comprises a first surface 30b and a second surface 31b. The first surface 30b comprises 3 isolated positive electrodes 33b. The isolated electrodes 33b are all the same size and are separated by gaps 38b. The second surface 31b (not shown) comprises three isolated negative electrodes 32b that are the mirror image of the isolated positive electrodes 33a. The positive and negative electrodes 33a and 33b form three measuring segments and the gaps 38b form two non-measuring segments.

Referring now to FIG. 6, a plurality of piezoelectric members 12c are shown positioned on substrate 14c. Piezoelectric members 12c are disc-like structures comprising a positive electrode 33c covering the entire top surface 30c and a negative electrode 32c covering the entire bottom surface 31c. To effectively measure the acoustical energy applied to the top surface of the substrate 14c, 45 piezoelectric members 12c are arranged into 3 sets of 15. One set is run along the centerline of substrate 14c and piezoelectric members 12c are placed roughly every 5 mm. A second set is to one side of the centerline and placed roughly 6 mm from the centerline. A third set is placed to the other side of the centerline and is spaced roughly 10 mm from the centerline. Common points shared (i.e. where three piezoelectric members 12c are aligned) between the sets would be at 17 mm, 82 mm, 148 mm and 159 mm from the edge of substrate 14c. The arrangement of the sets may be varied in placement depending upon the size of substrate 14c that is used and the size of the acoustical energy field applied. The placement of piezoelectric members 12c is designed to provide the ability to obtain full coverage for the measuring of acoustical energy.

A method of using substrate sensor apparatus 100 to measure the characteristics of an acoustical energy field will now be discussed. A transducer assembly (not shown) comprising a transducer and a transmitter may be used to apply an acoustical energy field. The transducer is generally made of a piezoelectric material, while the transmitter is generally made of a relatively inert, non-contaminating material, such as quartz, which efficiently transmits acoustic energy. It should be understood however that substrate sensor apparatus 100 is capable of functioning in any system where acoustical energy is being applied to the surface of a substrate.

The transmitter is vibrated so as to transmit acoustical energy through a meniscus, or film of fluid, that covers the substrate 14. The cleaning fluid may be water or any of the cleaning fluids that are typically used in the art in order to effectively clean substrates.

Upon the fluid being agitated by the acoustical energy, stress will be applied to the piezoelectric member 12. The piezoelectric member 12 will in turn emit a voltage representative of the amount of acoustical energy applied to the substrate 14 through the meniscus. The negative electrode 32 and positive electrode 33 will produce an electrical signal indicative of the characteristics of the acoustical energy field present at the segment of the piezoelectric member 12 on which the set of positive and negative 33, 32 electrodes are located. The characteristics include voltage and frequency. The electrical signal is transmitted to the electrical analyzer 10. The electrical analyzer 10 processes the electrical signals and generates a visual display corresponding to the characteristics of the acoustical energy field. As the amount of power to the transducer assembly is alternated, the strength of the acoustical energy is alternated and a profile of the energy that reaches the substrate 14 may be created. This profile can assist in determining whether or not the proper acoustical energy is being applied to substrate 14.

Monitoring could occur over a period of time and the profile of transducer assembly may accurately map the distribution of energy being applied to substrate 14. Periodic testing using substrate sensor apparatus 100 can also be used in order to determine whether or not a transducer assembly continues to function appropriately. Substrate sensor apparatus 100 may also be used to investigate the impact of tune frequency on sonic energy distribution. Apparatus 100 may also be used to provide a means to balance the energy from one cleaning system to another. The alignment of transducer assembly vs. energy readings may be taken, as well as a comparison of rod damage vs. particle removal efficiency for specific energy distributions. Transducer assembly may be retested at power levels that produce similar energy distribution values. These various tests can help produce uniform acoustical energy being applied to the surface of a substrate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for measuring characteristics of an acoustical energy field comprising:
   a piezoelectric member comprising a plurality of measuring segments;
   wherein each measuring segment comprises an isolated positive electrode and a negative electrode operably connected to the piezoelectric member so that when the piezoelectric member is subjected to the acoustical energy field, the positive and negative electrodes produce an electrical signal indicative of the characteristics of the acoustical energy field present at that measuring segment; and
   wherein the piezoelectric member further comprises a plurality of non-measuring segments that are free of positive electrodes, the non-measuring segments and the measuring segments arranged in an alternating pattern along the piezoelectric member.

2. The apparatus of claim 1 wherein the piezoelectric member is a rectangular bar having a top surface and a bottom surface.

3. The apparatus of claim 2 wherein the isolated positive electrodes are located on the bottom surface of the piezoelectric member and the negative electrodes are located on the top surface of the piezoelectric member.

4. The apparatus of claim 1 wherein the piezoelectric member is an elongated bar having a first surface and a second surface opposite the first surface, the isolated positive electrodes positioned along a length of the first surface in spaced relation.

5. The apparatus of claim 4 wherein each of the isolated positive electrodes is an electrically conductive material that covers an area of the first surface that extends an entire width of the first surface.

6. The apparatus of claim 4 wherein the negative electrode of each segment is formed by a continuous strip of electrically conductive material positioned along a length of the second surface.

7. The apparatus of claim 6 wherein the piezoelectric member further comprises a first end surface and a second end surface, and wherein the negative electrode is further positioned to extend along a length of the first end surface of the piezoelectric member.

8. The apparatus of claim 1 wherein a top surface of each measuring segment is entirely covered by an electrically conductive material that acts as the isolated positive electrode and wherein a top surface of each non-measuring segment is free of electrically conductive material.

9. The apparatus of claim 1 further comprising a flat substrate having a top surface and a bottom surface, wherein the piezoelectric member is bonded to the bottom surface of the substrate so that characteristics of an acoustical energy field applied to the top surface of the substrate can he measured by the measuring segments of the piezoelectric member.

10. The apparatus of claim 9 wherein the substrate is made of glass, quartz or silicone.

11. The apparatus of claim 9 wherein the substrate further comprises a plurality of holes forming passageways through the substrate, the plurality of holes aligned with the measuring segments of the piezoelectric member.

12. The apparatus of claim 9 wherein the piezoelectric member is positioned so as to extend from a side surface of the substrate to a center-point of the substrate.

13. The apparatus of claim 1 further comprising an electrical signal analyzer operably connected to the positive and negative electrodes.

14. The apparatus of claim 13 further comprising a filter for selecting a frequency range of the electrical signal.

15. The apparatus of claim 1 wherein each segment is of a sufficiently small size so that differences in wave characteristics of the acoustical energy field are eliminated.

16. An apparatus for measuring characteristics of an acoustical energy field comprising:
    a substrate having a top surface and a bottom surface;
    a piezoelectric member comprising a plurality of measuring segments comprising an isolated positive electrode and a negative electrode operably connected to the piezoelectric member so that when the piezoelectric member is subjected to an acoustical energy field, the positive and negative electrodes produce an electrical signal indicative of the characteristics of the acoustical energy field present at that measuring segment;
    the piezoelectric member further comprising a plurality of non-measuring segments that are free of positive electrodes, the non-measuring segments and the measuring segments arranged in an alternating pattern along the piezoelectric member; and
    the piezoelectric member bonded to the bottom surface of the substrate.

17. A method of measuring characteristics of an acoustical energy field at various locations comprising:
    (a) positioning an apparatus comprising a piezoelectric member in an acoustical energy field, the piezoelectric member comprising a plurality of measuring segments comprising an isolated positive electrode and a negative electrode operably connected to the piezoelectric member and a plurality of non-measuring segments that are free of positive electrodes, the non-measuring segments and the measuring segments arranged in an alternating pattern along the piezoelectric member; and
    (b) each set of positive and negative electrodes producing an electrical signal indicative of the characteristics of the acoustical energy field present at the segment on which the set of positive and negative electrodes are located.

18. The method of claim 17 further comprising:
    (c) processing the electrical signals; and
    (d) generating a visual display corresponding to the characteristics of the acoustical energy field based on the processed electrical signals.

19. The method of claim 17 wherein the apparatus further comprises a substrate having a topside and a backside, the piezoelectric member bonded to a backside of the substrate, wherein step (a) further comprises positioning the apparatus in the acoustical energy field so that the topside of the substrate is adjacent the acoustical energy field, the acoustical energy field passing through the topside of the substrate and being measured by the piezoelectric member on the backside of the substrate.

20. The method of claim 19 wherein step (a) further comprises applying a fluid to the topside of the substrate, the acoustical energy field passing through the fluid.

\* \* \* \* \*